J. H. Richardson's Impd Lantern.
72542
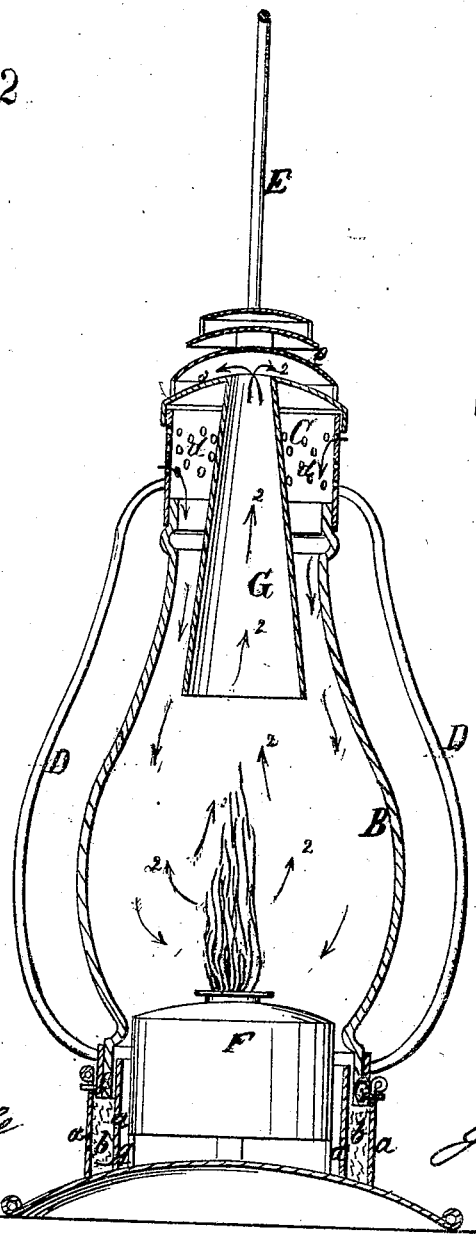
PATENTED
DEC 24 1867
Witnesses.
Theo Fincke
Wm Spence
Inventor
J. H. Richardson
Per Munn &
Attorneys

United States Patent Office.

JOSEPH H. RICHARDSON, OF PHILADELPHIA, PENNSYLVANIA.

Letters Patent No. 72,542, dated December 24, 1867.

IMPROVEMENT IN LANTERNS.

*The Schedule referred to in these Letters Patent and making part of the same.*

TO ALL WHOM IT MAY CONCERN:

Be it known that I, J. H. RICHARDSON, of Philadelphia, in the county of Philadelphia, and State of Pennsylvania, have invented a new and improved Lantern; and that the following description, taken in connection with the accompanying drawing, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved lantern designed more especially for ship and railroad-lanterns.

The invention consists in feeding the flame with oxygen from the top of the lantern, a direct draught upward from the bottom through the top of the same being avoided, whereby the flame will not be liable to be extinguished by gusts of wind or the swinging of the lantern, as is now the case with those which have a draught of air passing through them from the bottom upward, and are exposed to or carried in the open air.

The accompanying drawing represents a vertical central section of my invention.

A represents the metal base of the lantern, B the glass globe, C the metal top or cap, D the guards, and E the handle. F is the lamp, which is secured in the metal base A by any suitable catch or fastening. The lamp is encompassed by a double wall, $a\,a$, the space between which is supplied with cotton-waste or any suitable material, $b$, which will serve for a packing on which the metal rim $c$, on the lower end of the glass globe B, and the lower end of B rest or bear, as shown clearly in the drawing.

By this arrangement the lamp is fitted into the lower end of the lantern perfectly air-tight, no holes or perforations of any kind being made in the lower part of the lantern to admit the air.

The metal top or cap C of the lantern is perforated with holes $d$ all around, and this cap is provided with a pendent conical tube, G, which extends down within the glass globe B, and is covered by a plate, $e$, some distance above the top of the cap, with an opening all around, between $e$ and the top of the cap, to admit of the escape of the warm, vitiated air from the lamp, the pure air which feeds the flame passing down through the perforations $d$ in the side of the top or cap C, as shown by the arrows 1, the passage of the vitiated air being shown by the arrows 2.

By this arrangement the flame of the lamp will be abundantly supplied with air, and not liable to be affected or extinguished by sudden gusts of wind when hung or carried in exposed situations.

Having thus described my invention, I claim as new, and desire to secure by Letters Patent—

1. The perforated cap C, in combination with a lamp, F, fitted within or upon the base A of a lantern, substantially as and for the purpose specified.

2. I claim the double walls $a\,a$, when filled in with suitable material to form an air-tight joint, in combination with the globe or chimney B and ring $c$, encircling the base of the same, substantially as herein shown and described.

3. I claim the tube G and plate $e$, in combination with globe B and an air-tight joint around the lamp F, substantially as and for the purpose set forth.

The above specification of my invention signed by me, this 30th day of April, 1867.

JOSEPH H. RICHARDSON.

Witnesses:
WM. F. MCNAMARA,
J. A. SERVICE.